(12) United States Patent
Parish, Jr. et al.

(10) Patent No.: US 11,071,974 B2
(45) Date of Patent: Jul. 27, 2021

(54) COMPOSITION, METHOD AND APPARATUS FOR SULFITE REMOVAL FROM BEVERAGES

(71) Applicants: William L Parish, Jr., Maplewood, MN (US); Martin Babcock, White Bear Lake, MN (US)

(72) Inventors: William L Parish, Jr., Maplewood, MN (US); Martin Babcock, White Bear Lake, MN (US)

(*) Notice: Subject to any disclaimer, the term of this patent is extended or adjusted under 35 U.S.C. 154(b) by 184 days.

(21) Appl. No.: 15/369,578

(22) Filed: Dec. 5, 2016

(65) Prior Publication Data
US 2018/0154348 A1  Jun. 7, 2018

(51) Int. Cl.
| | |
|---|---|
| *B01J 41/13* | (2017.01) |
| *B01J 41/04* | (2017.01) |
| *B01J 47/012* | (2017.01) |
| *B01J 47/014* | (2017.01) |
| *C12H 1/14* | (2006.01) |

(52) U.S. Cl.
CPC .............. *B01J 41/13* (2017.01); *B01J 41/04* (2013.01); *B01J 47/012* (2017.01); *B01J 47/014* (2017.01); *C12H 1/14* (2013.01); *A23V 2002/00* (2013.01)

(58) Field of Classification Search
None
See application file for complete search history.

(56) References Cited

U.S. PATENT DOCUMENTS

| | | | | |
|---|---|---|---|---|
| 9,670,442 | B2* | 6/2017 | Meadows | C12H 1/0432 |
| 2010/0022731 | A1* | 1/2010 | Ryan | C08F 26/06 |
| | | | | 526/263 |
| 2010/0166930 | A1* | 7/2010 | Deleuze | B01J 20/267 |
| | | | | 426/490 |
| 2015/0093485 | A1* | 4/2015 | Kornacki | C12H 1/0416 |
| | | | | 426/442 |

OTHER PUBLICATIONS

Diaf: Thermally Reversible Polymeric Sorbents for Acid Gases: C02, S02, and NOx; Journal of Applied Polymer Science, vol. 53, 857-875 (1994); © 1994 John Wiley & Sons, Inc. (Year: 1994).*

* cited by examiner

*Primary Examiner* — Patricia A George
(74) *Attorney, Agent, or Firm* — Mark A. Litman & Associates, P.A.

(57) ABSTRACT

Multipart functionalized materials are shown that remove sulfites from beverages and in particular wine. The functionalized materials consist of a solid support material having the ability to link polycarbonyls or polyamines thereto. The polycarbonyls and polyamines remove free and bound sulfites when put in contact with the beverage. The polycarbonyl and polyamine functionalized materials can be used separately or mixed together for accomplishing sulfite removal.

15 Claims, 7 Drawing Sheets

SECTION A-A

GRAPH A

COMPOSITION, METHOD AND APPARATUS FOR SULFITE REMOVAL FROM BEVERAGES

FIELD OF THE INVENTION

The present invention relates generally to a method and apparatus for the removal of sulfite from a beverage containing both free and bound sulfite by filtering the sulfite through a specially prepared filter media and more specifically where the filter media contains chemical functional groups designed for rapid binding of the free and bound sulfite thereto.

BACKGROUND OF THE INVENTION

Preservation of food and beverage items is a requirement to provide a product that has a storage period sufficient to allow for the production of the item and the maintenance of the quality of the product until it is consumed. Sulfur Dioxide ($SO_2$) and Sulfites ($R$—$SO_3$), both hereinafter referred to as "sulfites" are used as preservatives in many different types of food and beverages. Both possess antioxidant properties as well as antimicrobial properties that provide a number of advantages for the storage of food and beverage items.

Sulfiting, (for the purposes of this discussion also meaning the application $SO_2$) is a common procedure for the prevention of browning in foods and beverages regardless of the mechanism of color formation. The amino-carbonyl browning of dehydrated pork is effectively inhibited by storing the meat in a nitrogen atmosphere containing 500 ppm sulfur dioxide. Color retention in dried fruits is enhanced by treatment with sulfites. Sulfites also act as a preservative for pineapples, papaya, and bananas. Treating grapes with sulfur dioxide prior to and during storage has been shown to be effective in preventing decay due to *Botrytis cinerea*, a plant pathogen. In wines, sulfites are used to provide an antimicrobial and antioxidant effect. The wine is protected against browning by sulfites and they regulate the growth of harmful yeast and bacteria in the wine. Sulfites also have the ability to react with carbonyl compounds in wine to form non-volatile bisulfite adducts that reduce unpleasant smells and tastes.

Wine, both red and white wines, commonly contain sulfites up to 300 ppm to maintain the properties of the wine until it is ready to be consumed. However, sulfite can itself also lead to a negative impact on the flavor of the wine and there is evidence that some individuals have sensitivity to sulfites and must avoid food or beverages containing them. As a preservative, the sulfite in the wine performs its function while it is in storage, but once the wine is ready for consumption it has served its purpose and is no longer needed.

A number of different methods for the removal of sulfite from a beverage have been developed in the past but have not represented an optimal solution to sulfite removal from wine. U.S. Pat. No. 5,358,732 describes a point of use device which uses a compound which generates hydrogen peroxide when contacted by water. While the hydrogen peroxide will oxidize the sulfite to a sulfate and render it somewhat less reactive, it does not remove the sulfate from the wine. Unfortunately, hydrogen peroxide will also undesirably oxidize other compounds in the wine with detrimental impact on the flavor of the wine. This approach also suffers from an inability to add exactly the right amount of hydrogen peroxide for the amount of sulfite in the wine as the sulfite concentration in the wine can vary due to a number of reasons involving the processing and storage of the wine. Thus, the end user has no way of analyzing the wine for sulfite concentration in order to add the correct amount of hydrogen peroxide.

U.S. Pat. No. 5,071,664 describes the use of ion exchange resins to remove the sulfite from wine in a process setting. However, along with the sulfite, much of the color and other desirable flavor compounds can be removed from the wine which would be unacceptable to the end user. Ion exchange does have some value industrially in the wine industry where thousands of gallons of wine can be pretreated in this manner prior to remixing and blending but it is not a viable alternative for the consumer wanting to treat a single bottle of wine.

A recent patent application US 2015/0093485 describes a filter material having carbonyl monomer molecules attached to a solid support filter material. The wine is first passed through this filter media as it is poured either into a glass for consumption or into a larger decanter. The carbonyl group will react with the free sulfite in the wine to remove it. In practice however, as described, this device only removes a few ppm of the free sulfite leaving the majority of the free sulfite in the wine. Also, as previously indicated, sulfite is present in wine as both free sulfite in solution and in a bound form attached to other compounds in the wine, which bound form is in equilibrium with the free sulfite. Thus, as free sulfite is removed from the wine by a sulfite absorbent more will come into solution, due to the equilibrium relationship between the free and bound sulfite, resulting in a restoration of the free sulfite in the wine. Thus, it would be difficult for this filtration approach to remove all of the bound sulfite without time consuming retreatments that would be inconvenient and potentially costly for a consumer.

SUMMARY OF THE INVENTION

The present invention comprises multipart functionalized compositions for removing free and bound sulfite from a beverage. The functionalized compound/material includes a solid support containing sulfite removing molecules. A sulfite removing molecule includes polycarbonyls, amines and polyamines. The polyamines having primary amine groups bound with a polymer carbonyl compound that will react with the sulfite contained in the beverage more specifically but not limited to a wine beverage. In an additional embodiment, the polymeric carbonyl compound is combined with another solid support resin containing a primary amine functional group on the surface of the support and/or a polymer containing a primary amine functional group in many repeating units of the polymer. A third embodiment is a solid support material containing just the primary amine functional group and/or a polymer containing a multitude of primary amine functional groups. The primary amine can be of several forms with a preferred form being a benzylamine functional group. Aliphatic primary amine groups can be used but it is believed the benzylamine group will react more quickly with the free and bound sulfite contained in the beverage. The first embodiment of 100% polycarbonyl functionalized solid support will react with the free sulfite contained in the beverage binding it to the solid support material and removing it from the beverage—more specifically a wine beverage. The polycarbonyl functionalized solid support has the additional benefit of removing additional undesirable compounds from the wine such as amine compounds produced in the fermentation of the wine. The polycarbonyl functionalized solid absorbent will generally not remove the color of the wine as it passes through the absorbent resin filter. In the second embodiment, the polycarbonyl functionalized solid support can be mixed with a second solid support functionalized with an amine or polyamine compound. This mixture of the two absorbents has the advantage of removing both the free sulfite and bound sulfite contained in the beverage resulting in removal of the majority of both free and bound sulfite in the beverage. The amine containing absorbent is able to react with the bound sulfite present as hydroxysulfonates as well as the free sulfite. The ratio of this mixture of polycarbonyl absorbent and amine or polyamine absorbent can extend from 100% of the polycarbonyl absorbent/0% of the amine or polyamine absorbent to 0% of the polycarbonyl absorbent/100% of the amine or polyamine absorbent. A preferred ratio might extend from 90% polycarbonyl/10% amine or polyamine absorbent to 10% polycarbonyl/90% amine or polyamine absorbent. A more preferred ratio might be 60% polycarbonyl/40% amine or polyamine absorbent to 40% polycarbonyl/60% amine or polyamine absorbent. In the third embodiment, the amine or polyamine functionalized solid support absorbent can be used by itself. The amine or polyamine absorbent has the advantage of removing both free and bound sulfite from the beverage. This absorbent version can also be used to remove excess aldehyde oxidation product from the wine beverage caused by the exposure of the wine to oxygen after the bottle of wine is opened and exposed to air.

More specifically, the present invention solves the problem of removal of both free and bound sulfite by utilizing a polycarbonyl polymer attached to a primary amine functional ion exchange resin. It is understood that glutaraldehyde will polymerize in an aldol type condensation reaction at high pH levels. Each unit of the polymer contains a carbonyl aldehyde group which can react with sulfite in the wine greatly expanding the capacity of the resin to remove sulfite from the wine. The aldol condensation also produces a double bond which is in the alpha, beta position to the carbonyl group. This double bond forms a conjugated bond with the carbonyl group surprisingly increasing the reactivity of the carbonyl group containing molecule making it more effective in reacting with the sulfite present in the wine. Surprisingly it has been found that molecules with carbonyl groups containing a conjugated double bond are more reactive and more effective in reacting with and removing sulfite ions from the wine. Another aldehyde containing this conjugated double bond is cinnamaldehyde which was also found to be effective in removing sulfite from wine.

In addition to the polycarbonyl polymer attached to a solid support, a primary amine functional ion exchange resin can be used alone or blended with the carbonyl polymer containing resin. The primary amine functional resin was found to not only react with and remove the free sulfite in the wine but also the bound sulfite effecting essentially the total removal of both free and bound sulfite from the wine. An aliphatic primary amine functional ion exchange resin can be used for this purpose but a preferred primary amine functionality is benzylamine. Not to be bound by this theory, but it is felt that the benzylamine group exhibits a higher reactivity with the free and bound sulfite as compared to an aliphatic primary amine. A polymer can also be formed containing the benzylamine group greatly expanding the capacity of the amine to combine with both the free and bound sulfites in the wine mixture.

Ion exchange resins (IER's) can be fairly non-selective in what they remove from a solution as each IER has a selectivity preference for different ions present in the solution. In the case of wine, the anion exchange resins used in this invention have a tendency to remove phenolic compounds most strongly. The color compounds contained in wine are composed of phenolic type compounds and the IER has a tendency to remove these compounds if left unaltered. This tendency can be reduced by pretreating the IER with a compound that the IER has a higher selectivity for such as wine tannins. Thus, by pretreating the IER with a mixture of wine tannins the tendency to remove compounds other than the desired sulfite ions can be reduced or eliminated. Reacting the primary amine groups on the ion exchange resin with the polymeric glutaraldehyde compound will also eliminate the tendency of the IER to remove color compounds and other acids and flavonoids compounds from the wine preserving the desirable characteristics and eliminate all the sulfur containing compounds. Those skilled in the art will now understand that other compounds can also be used to pretreat the IER to positively impact its removal properties so desirable wine components are not removed.

DETAILED DESCRIPTION OF THE INVENTION

Figure 1:
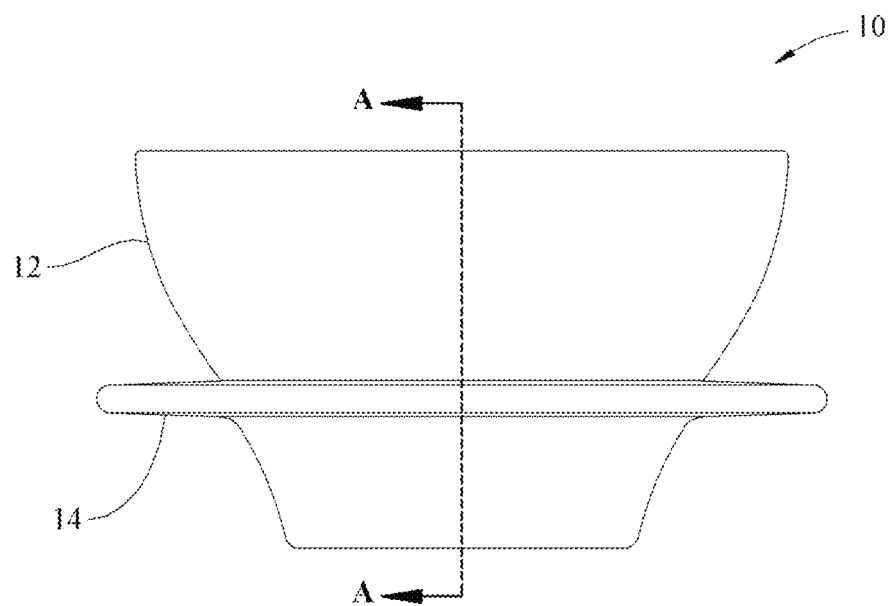
FIG. 1 shows a side plane view of the sulfite removal apparatus of the present invention.

For the purpose of understanding the following Detailed Description and Experimental examples, definitions are used.

Monomer—A monomer is a molecule that forms the basic unit for polymers. Monomers may bind to other monomers to form a repeating chain molecule.

Polymer—A macromolecule formed by the chemical union of 5 or more identical combining units called monomers.

Ion Exchange Resin—An insoluble polymer containing charged groups or ions that can be exchanged for charged groups or ions present in a surrounding solution.\

Catalyst—a substance that increases the rate of a chemical reaction without itself undergoing any permanent chemical change.

Sputter Coater—A coating device containing a plasma where a metal target is bombarded with heavy gas atoms (usually argon but air is a fair substitute). Metal atoms ejected from the target by the ionized gas cross the plasma to deposit onto any surface within the coating unit including the specimen.

Aldehyde—an organic compound containing the group —CHO

Conjugated Double Bond—a conjugated system is a system of connected p-orbitals with delocalized electrons in molecules with alternating single and multiple bonds, which in general may lower the overall energy of the molecule and increase stability.

pH—a measure of acidity and alkalinity of a solution that is a number on a scale from 1 to 14 on which a value of 7 represents neutrality and lower numbers indicate increasing acidity and higher numbers increasing alkalinity Carbonyl Group—a carbonyl group is a functional group composed of a carbon atom double-bonded to an oxygen atom Free Sulfite—Sulfites that are contained in the beverage but are not chemically bound to another compound in the beverage.

Bound Sulfite—Sulfite that has reversibly combined to form a compound called a hydroxysulfonate.

Beverage—A liquid that is intended for consumption by human beings.

Bind—To combine with, form a chemical bond with, or be taken up by, as an enzyme with its substrate.

Sulfiting—The addition of a sulfite to a material for the purpose of improving its storage stability.

Absorbent—is a material that takes in another substance.

Aldol Condensation Reaction—An aldol condensation is an organic reaction in which an enol or an enolate ion reacts with a carbonyl compound to form a β-hydroxyaldehyde or β-hydroxyketone, followed by a dehydration to give a conjugated enone.

Enolate—An intermediate reaction structure consisting of an oxygen atom with a negative charge adjacent to a C=C double bond.

Enone—An alpha, beta unsaturated carbonyl.

Alpha position—The alpha carbon (a carbon) in organic molecules refers to the first carbon atom that attaches to a functional group, such as a carbonyl.

Beta Position—The carbon atom two carbon atoms away from the carbonyl group is called the beta carbon.

Primary Amine—Primary amines arise when one of three hydrogen atoms in ammonia is replaced by an alkyl or aromatic Aliphatic—relating to or denoting organic compounds in which carbon atoms form open chains (as in the alkanes), not aromatic rings.

Functionalized—To add a functional group to a compound.

HIPE (High Internal Phase Emulsion)—An emulsion with an internal phase content of 74% or more.

Functional Group—A specific grouping of elements that is characteristic of a class of compounds, and determines some properties and reactions of that class.

Figure 2:
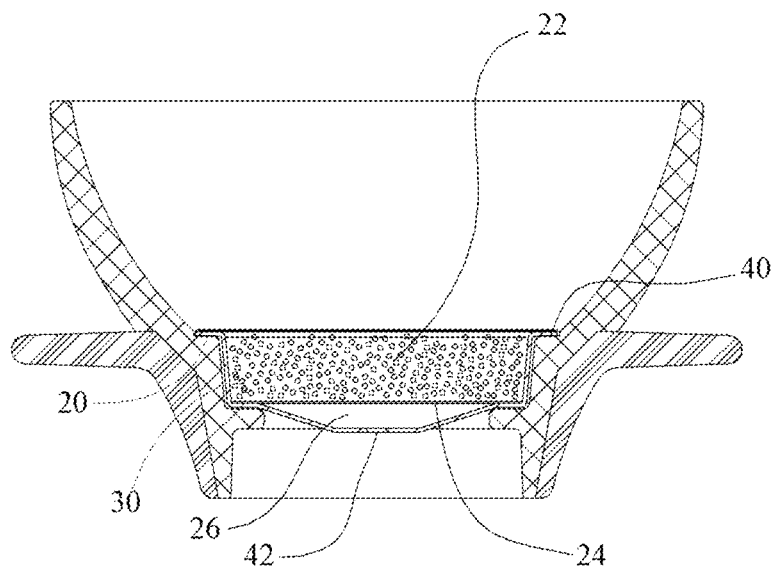
FIG. 2 shows a cross-sectional view of the sulfite removal apparatus of FIG. 1 along lines A-A thereof

As seen by referring to FIGS. 1 and 2 the sulfite removal apparatus assembly of the present invention is generally indicated by the number 10 and includes an absorbent containing replaceable cartridge 30. The apparatus 10 includes a funnel shaped liquid receiver portion 12 having a support rim 14 used to support apparatus 10 over a beverage container such as a wine glass. The funnel shaped receiver 12 contains an inner ridge 20 for receiving a flange 40 of the disposable cartridge 30 to seal against to keep liquid from by-passing the disposable cartridge.

Figure 3:
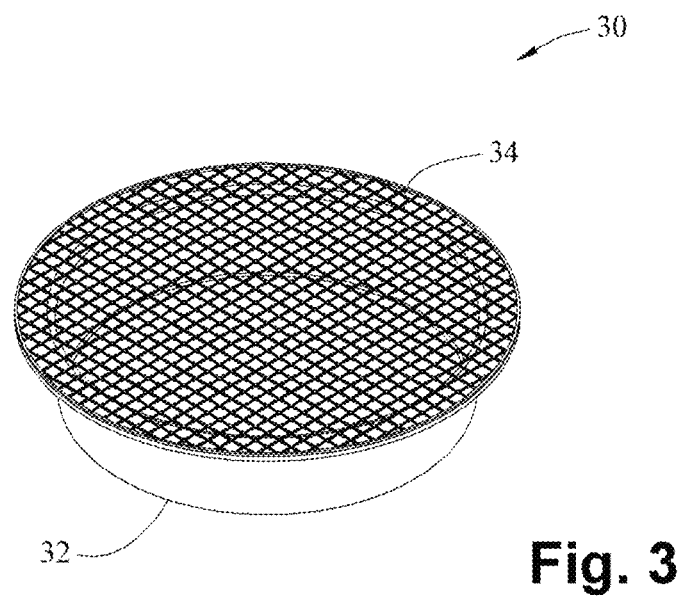
FIG. 3 shows a top perspective view of the filter element of the present invention.
Figure 4:
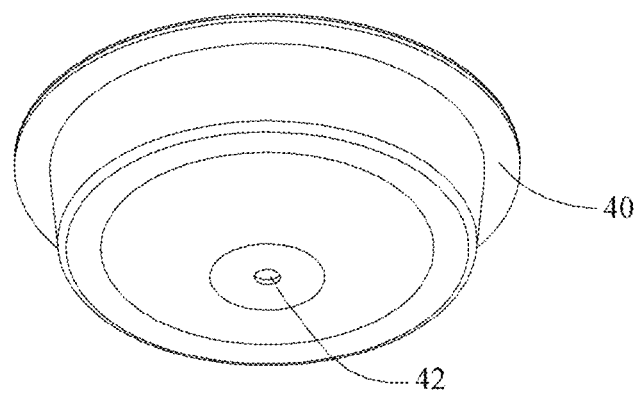
FIG. 4 shows a bottom perspective view of the filter element of the present invention.

As seen in the cross-section of FIG. 2, the disposable cartridge 30 contains the absorbent material 22 that acts to retain sulfites and other ingredients from the beverage. As seen by also referring to FIGS. 3 and 4 the disposable cartridge 30 is a thermoformed or molded plastic material and on a lower end 32 thereof contains a lower sheet filter material barrier 24 as seen in FIG. 2 to prevent the absorbent material from washing out of the cartridge and also to catch any particles entrained in the beverage such as cork fragments. In FIG. 2, cartridge 30 also has a lower void area 26 that collects the beverage after it exits the absorbent and funnels the liquid through a flow control hole 42 seen in FIG. 4 located at the bottom of the lower funnel to control the rate that the beverage passes through the absorbent beads. The void area 26 also facilitates drying of the absorbent beads between uses. As seen in FIG. 3 cartridge 30 includes a porous top surface 34 for allowing a liquid beverage to enter the absorbent containing chamber.

Figure 5:
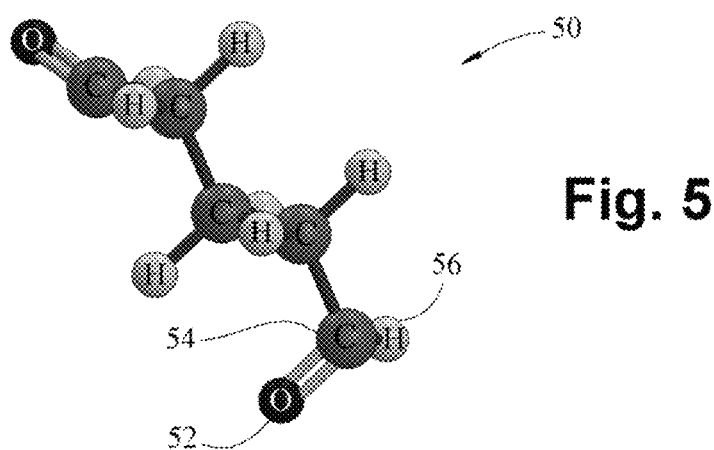
FIG. 5 shows a three dimensional representative illustration of a single glutaraldehyde molecule.
Figure 6:
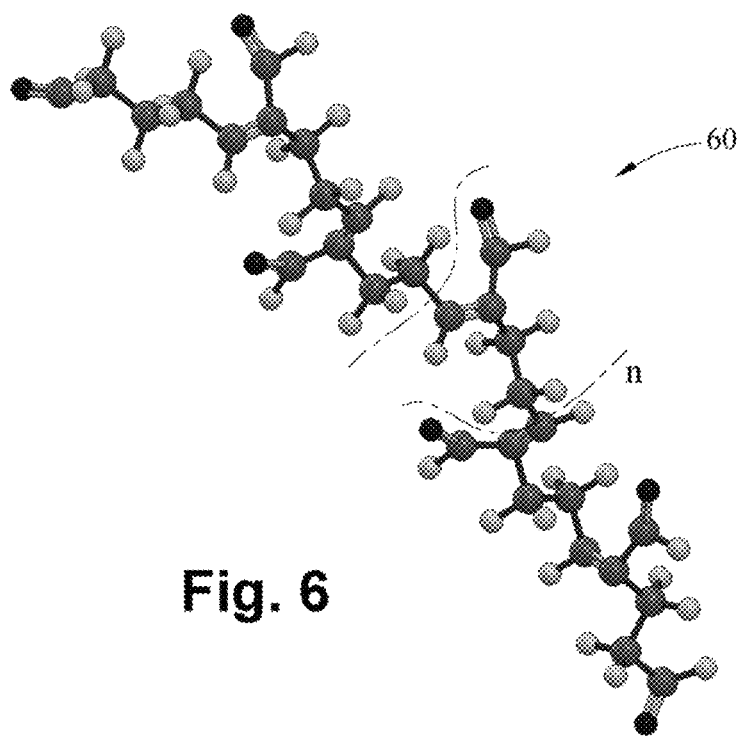
FIG. 6 shows a three dimensional representative illustration of a poly-glutaraldehyde molecule.
Figures 7, 7A, 7B:
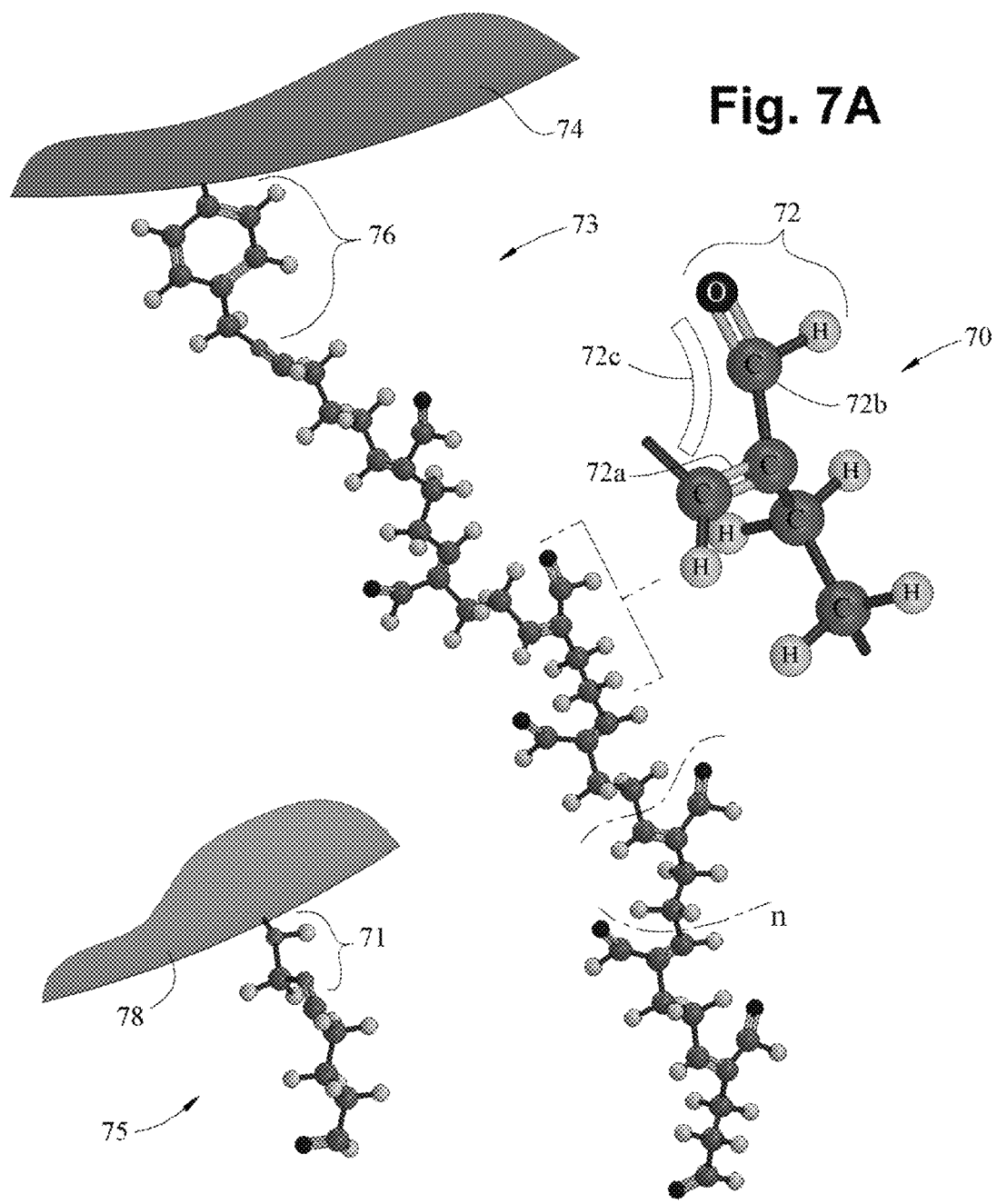
FIG. 7 shows a further three dimensional representation of a polyglutaraldehyde molecule attached to a solid support.
FIG. 7A shows a three dimensional representation of a single aldehyde functional group repeating unit from the polymer to illustrate the double bond located between the alpha and beta position to the aldehyde group carbonyl carbon in the polymer
FIG. 7B shows a single glutaraldehyde molecule attached to a solid support.

As seen by referring to FIG. 5, a molecule of glutaraldehyde 50 is shown. Glutaraldehyde contains 2 aldehyde groups each consisting of an oxygen atom 52 double bonded to a carbon atom 54 with one hydrogen atom 56 also bonded to the carbonyl carbon atom 54. As seen in FIG. 6, the polymeric form of glutaraldehyde, polyglutaraldehyde 60 is shown. The polymer of glutaraldehyde, as is understood by those of skill, is formed by a polymerization reaction that occurs at high pH. In FIG. 7A, the repeating unit in a polyglutaraldehyde molecule 70 is characterized by an aldehyde functional group 72 having a double bond 72a located between the alpha A and beta B positions to the aldehyde group carbonyl carbon 72b. This forms a conjugated double bond 72c with the carbon—oxygen double bond in the aldehyde group 72 which it is believed surprisingly increases the reactivity of the aldehyde group 72. This structure is repeated for each repeating unit of the polyglutaraldehyde molecule 60 which can number in the thousands as opposed to a single aldehyde group 72 which has only one group capable of reacting with sulfite contained in a beverage.

As seen in FIG. 7, a polyglutaraldehyde molecule 73 is illustrated attached to a solid styrene particle 74 through a benzyl amine functional group 76 on the surface of a polystyrene bead 74. The benzyl amine functional group 76 reacts with one of the aldehyde groups on a polyglutaraldehyde molecule 73 for attaching the polyglutaraldehyde molecule to polystyrene bead 74. As seen in FIG. 7B, a commercial polystyrene particle 78, as available from Purolite, Inc. located at 150 Monument Road, Bala Cynwyd, Pa. 19004, US, consists of a surface containing alkyl amine functional groups. Activation of the polystyrene surface is accomplished by reacting the alkyl amine with glutaraldehyde buffered to maintain a lower pH. In this case, a single glutaraldehyde molecule 75 is illustrated reacted with an alkyl amine group and attached to the solid styrene particle. This structure of course has only one aldehyde group per bonding site on the polystyrene particle surface versus the thousands of aldehyde functional groups on the polyglutaraldehyde molecule per bonding site on the polystyrene particle.

Figures 8, 8A:
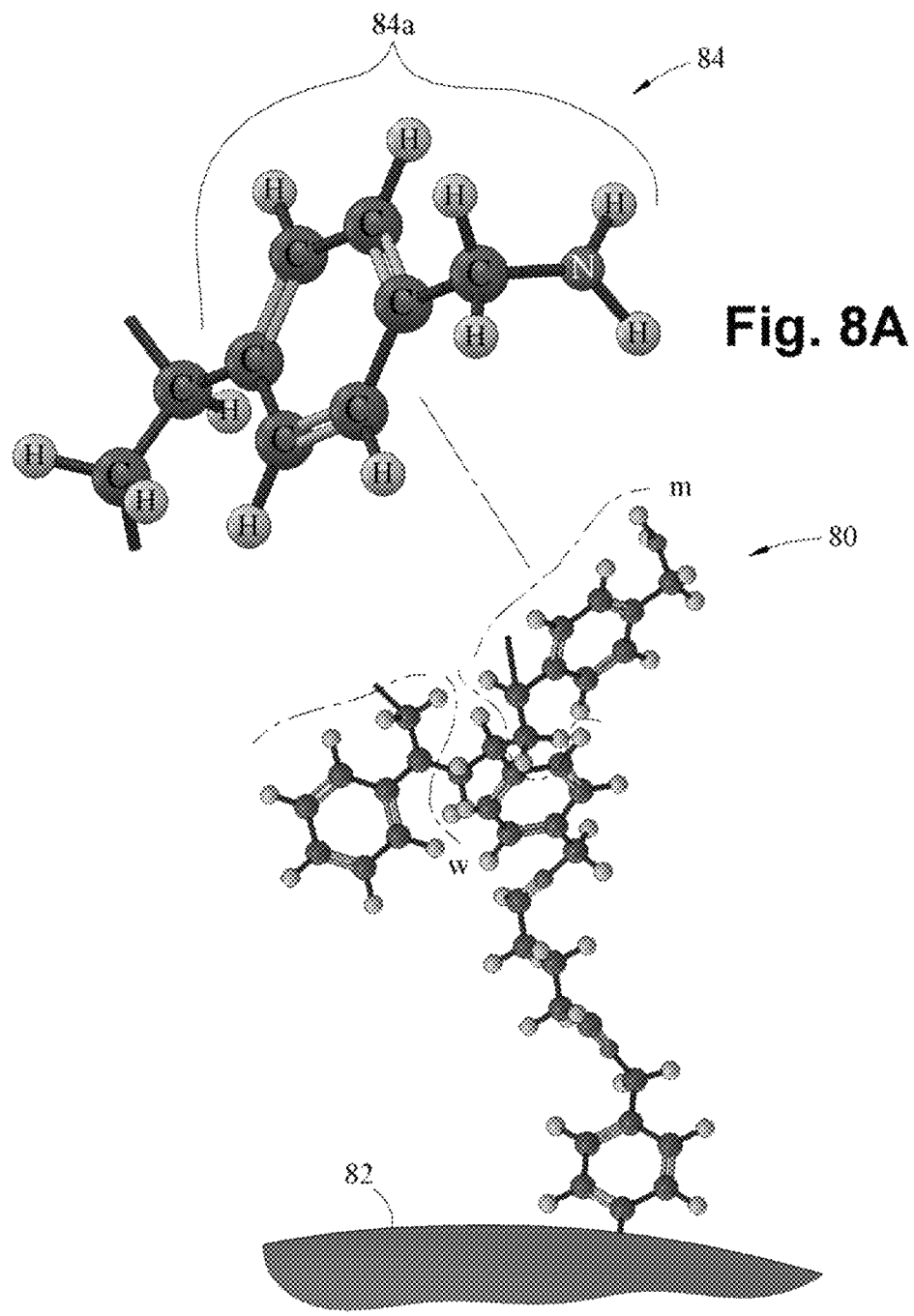
FIG. 8 show a three dimensional representation of a polybenzylamine molecule attached to a solid support.
FIG. 8A shows an expanded view of a benzylamine repeating unit portion of the polybenzylamine molecule of FIG. 8.
Figure 9:
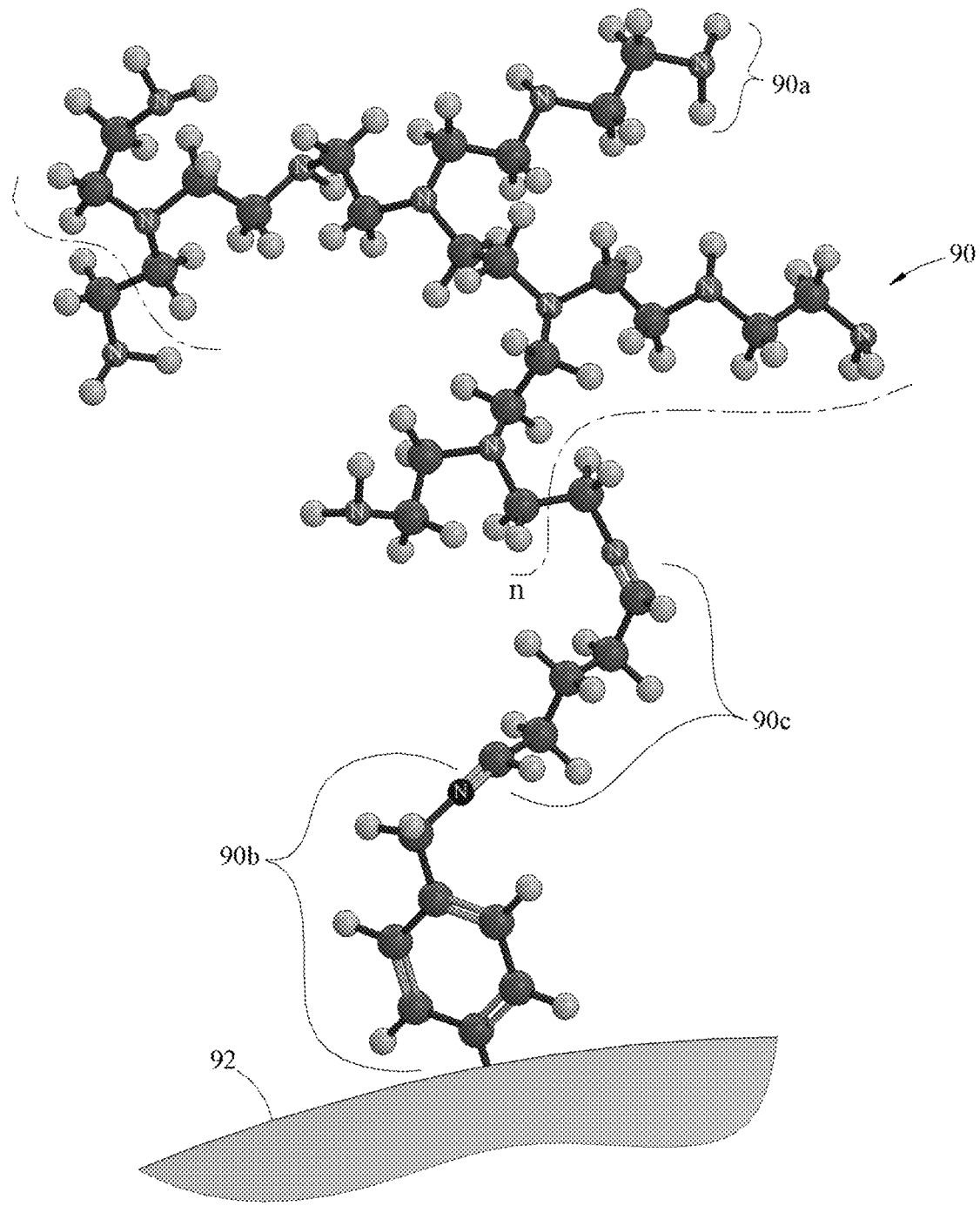
FIG. 9 shows a three dimensional representation of a molecule of polyethyleneimine attached to a solid support.
Figure 10:
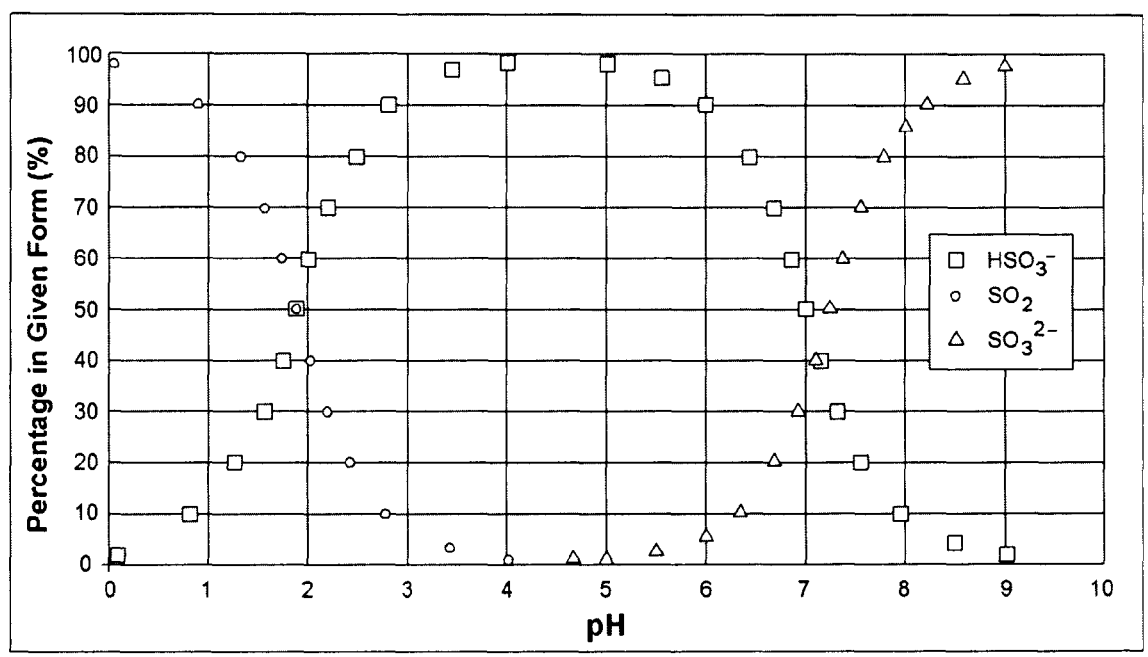
FIG. 10 shows a graphic representation of Molecules versus pH in Percentages.

FIG. 8 illustrates a polybenzylamine molecule 80 attached to a solid support 82. As seen by also referring to FIG. 8A, the repeating unit of the polybenzylamine molecule 84 contains a primary benzylamine group 84a. The polymer illustrated is shown as a copolymer with styrene. FIG. 9 illustrates a molecule of polyethyleneimine 90 attached to a solid support 92. Each polyethyleneimine molecule 90 contains many primary amine groups 90a. The polyethyleneimine molecule is attached to a solid bead functionalized with a benzylamine group 90b through a glutaraldehyde linking molecule 90c.

The solid support material can be comprised of a polymer bead of multiple micron size. It can be a solid or more preferable a porous solid with high surface area. Porosity in the bead can be created by different processes. A standard method to create a porous solid bead is through the polymerization of a monovinylaromatic compound like styrene and a polyvinylaromatic compound like divinylbenzene. The process for producing a heterodispersed porous bead from styrene and divinyl benzene to be used as a solid support is described in the book "Ion Exchange" by Friedrich Helfferich and is incorporated herein by reference. The solid support beads may be heterodisperse or monodisperse and macroporous or gel types (microporous). It is possible to produce beads of consistent uniform size called monodisperse beads. The various production processes of monodisperse bead polymers both by the jetting principle and by the seed-feed principle are known to those skilled in the art. Reference is made to U.S. Pat. No. 4,441,961, EP-A 0 046 535, U.S. Pat. No. 4,419,245 and WO 93/12167, which references are incorporated herein by reference thereto. Other bead manufacturing processes are known to those skilled in the art. As is also understood, monovinylaromatic unsaturated compounds comprise compounds such as styrene, vinyltoluene, ethylstyrene, alpha-methylstyrene, chlorostyrene or chloromethylstyrene. Polyvinylaromatic compounds (crosslinkers) used include divinyl-bearing aliphatic or aromatic compounds. For example, use is made of divinylbenzene, divinyltoluene, trivinylbenzene, ethylene glycol dimethacrylate, trimethylol propane trimethacrylate, hexa-1, 5-diene, octa-1,7-diene, 2,5-dimethyl-1,5-hexadiene and also divinyl ether.

In addition to the use of aromatic monomers as the starting material for the polymeric ion exchange resin (solid bead support) (for example, vinyl and vinylidene derivatives of benzene and of naphthalene (vinylnaphthalene, vinyltoluene, ethylstyrene, alpha-methyl-styrene, chlorostyrenes, and styrene), various non-aromatic vinyl and vinylidene compounds may also be employed. For example, acrylic acid, methacrylic acid, $C_1$-$C_8$ alkyl acrylates, $C_1$-$C_8$ alkyl methacrylates, acrylonitrile, methacrylonitrile, acrylamide, methacrylamide, vinyl chloride, vinylidene chloride, and vinyl acetate.

Another technique for making a solid porous support is through the use of HIPE—high internal phase emulsions. The porous solid is made in bead form but can also be made as a monolith—a single piece of porous solid. Many different types of porous supports are possible and reference is made to the book "Porous Polymers" by Silverstein et al. incorporated herein as reference.

The solid support can also be comprised of a fibrous material of fine denier or nanofiber produced as mats of fiber or fiber bundles again providing a large surface area for bonding of the functional groups. Another form for the solid support is a relatively flat aldehyde functional membrane material containing functional groups bonded to its surface similar to Sartorius Sartobind Aldehyde, as manufactured by Sartorius AG, Weender-Landstr., 94-108, 37075, Goettingen, DE.

A preferred fiber material is chitosan fiber available from manufactures like G.T.C. Bio Corporation, located at 52 Hong Kong Middle Street, Qingdao, Shandong Province, CN. Chitosan is a linear polysaccharide composed of randomly distributed Beta (1-4)-D-glucosamine (deacetylated unit) and N-acetyl-D-glucosamine(acetylated unit), as depicted immediately below.

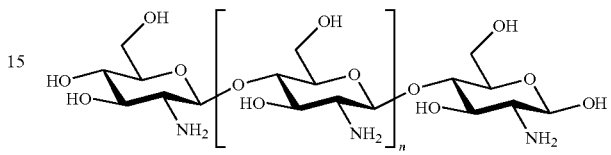

The primary amine groups on the chitosan fiber provide bonding sites to attach the polyglutaraldehyde and/or polyamine functional polymers.

Another solid support material is diatomaceous earth—a high surface area particle like solid support material. Diatomaceous earth is a naturally occurring, soft, siliceous sedimentary rock that is easily crumbled into a fine white to off-white powder. Particle size can vary widely depending on its type and how it is processed. It is a highly porous support material with high surface area.

A preferred support material is Lewatit OC1065 anionic ion exchange resin made by Laxness Corp. Lewatit OC1065 is an ion exchange resin functionalized with a primary benzyl amine group. The manufacture of this amine functional resin is described in U.S. Pat. No. 8,414,689 incorporated herein as reference.

In one embodiment of the absorbent, the OC1065 resin is modified with a carbonyl containing polymer which will react with the sulfite ions contained in the beverage. In this embodiment, the primary amine group acts as the linking group between the solid support and the polycarbonyl functional group. Other types of linking groups could be used and the benzyl amine group is a non-limiting example of this type of linking group. Amination of the solid support can also be accomplished through chloromethylation of the solid support followed by amination with a suitable amine containing compound. Carboxylic acids like acrylic acid and methacrylic acid and their polymers can act as linking groups to attach an amine to a solid support.

Glutaraldehyde will react with the primary amine groups on the surface of the solid support. By maintaining a high pH during the reaction with the amine groups on the surface of the solid support the glutaraldehyde will form a polymer by an aldol condensation reaction, seen immediately below, for greatly increasing the number of functional sites available for binding with sulfite ions in the beverage.

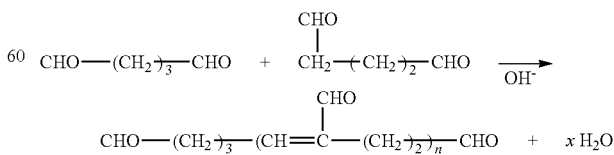

Molecular weights on the order of 15,000 to 20,000 Daltons can be produced in this fashion. The formation of a polymer attached at one end to a solid support material allows the aldehyde functional polymer to extend outward from the solid support surface into the beverage liquid phase improving the ability of the aldehyde to bind with the sulfite in the beverage. By producing this polymer the functionality of each amine anchor site is greatly expanded greatly increasing the ability of the solid support resin to bind to the desired target sulfite ions present in the beverage. Activating the surface of the resin just with monomeric glutaraldehyde only produces one carbonyl group for each primary amine group on the surface of the resin. Glutaraldehyde will polymerize spontaneously at room temperature in an environment of high pH. An aldol condensation reaction will occur with glutaraldehyde when the pH of the reaction medium is raised to 9 or above. Reaction rate increases significantly as pH increases. Significantly as the glutaraldehyde polymerizes, a double bond is produced between the alpha and beta position to the carbonyl aldehyde group. This structure repeats for every unit of the polymer. The presence of the double bond provides a conjugation with the carbonyl group which acts to increase the reactivity of the aldehyde group as compared to a similar group but without the presence of the conjugated double bond.

Free sulfite can exist in three different ionic states depending on the pH of the solution containing it —$SO_2$, $HSO_3^-$, and $SO_3^{-2}$. Graph A below illustrates the concentration of each of the ionic states of sulfite that exist Vs the pH of the beverage.

Graph A shows a representation of molecules ($HSO_3-$, $SO_2$ and $SO_3^{2-}$ in Percentages.

At wine pH the majority of the free sulfite exists as the bisulfite ion $HSO_3^-$. A non-limiting example of the reaction between the carbonyl group on the polyglutaraldehyde and the bisulfite ion creating a hydroxysulfonate is shown immediately below. Each repeating unit of the polyglutaraldehyde molecule can potentially react with 2 molecules of bisulfite as illustrated below again expanding the capacity of the absorbent to bind to the sulfite in the wine.

Sulfite will react primarily with carbonyl containing ingredients contained in the beverage and more specifically in the wine. Additional molecular components of wine react with sulfite and include but are not limited to Acetaldehyde, Pyruvic acid, Ketoglutaric acid, Glucose and Fructose. Hydroxysulfonates of these compounds are referred to as bound sulfite. The majority of the bound sulfite is contained in the hydroxysulfonate reaction product with acetaldehyde. These bound forms of the sulfite are in equilibrium with the free sulfite. As free sulfite is removed, the equilibrium relation will act to restore the free sulfite.

Another function of the carbonyl functional polymer containing resin is that the carbonyl aldehyde group will react with certain amine compounds that are formed during the fermentation of the wine. These amine compounds are present in small but detectable amounts after the fermentation of the wine. Generally they are left in the wine and are consumed as the wine is consumed. One of the amines produced during fermentation is histamine which is a known vasodilator and may contribute to headache development after consuming the wine. Removal of these amine compounds can be beneficial to a person consuming the wine and in some cases provides a more enjoyable experience to the consumer.

The benzylamine functionality has the ability to react with the bound sulfite in the wine mixture as well as the free sulfite. A generalized non-limiting reaction between the aromatic primary amine and a hydroxysulfonate is set out immediately below.

Reaction of Benzylamine and Hydroxysulfonate

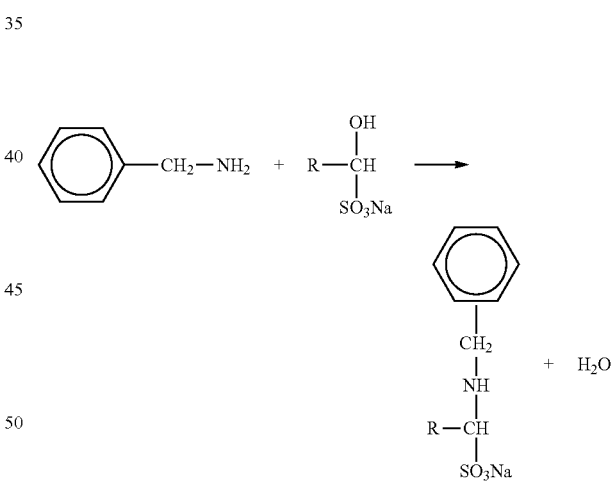

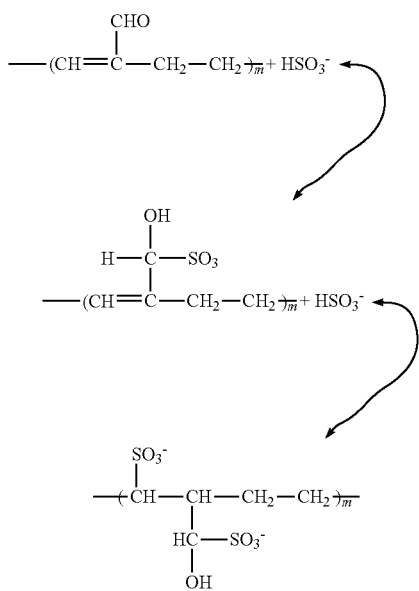

Combining the polycarbonyl functional resin with the primary amine functional resin allows for the removal of both the free sulfite and bound sulfite present in the wine. The primary amine functionalized solid support can also be used as the sole absorbent to bind both free and bound sulfite in the beverage.

A polymer containing the benzylamine functionality can be formed and attached to the solid resin greatly increasing the capacity of the aromatic primary amine to react with the free and bound sulfite in the wine. A polybenzylamine compound has been described in the literature and the formation thereof is depicted in the reaction set out immediately below.

Polybenzylamine Synthesis

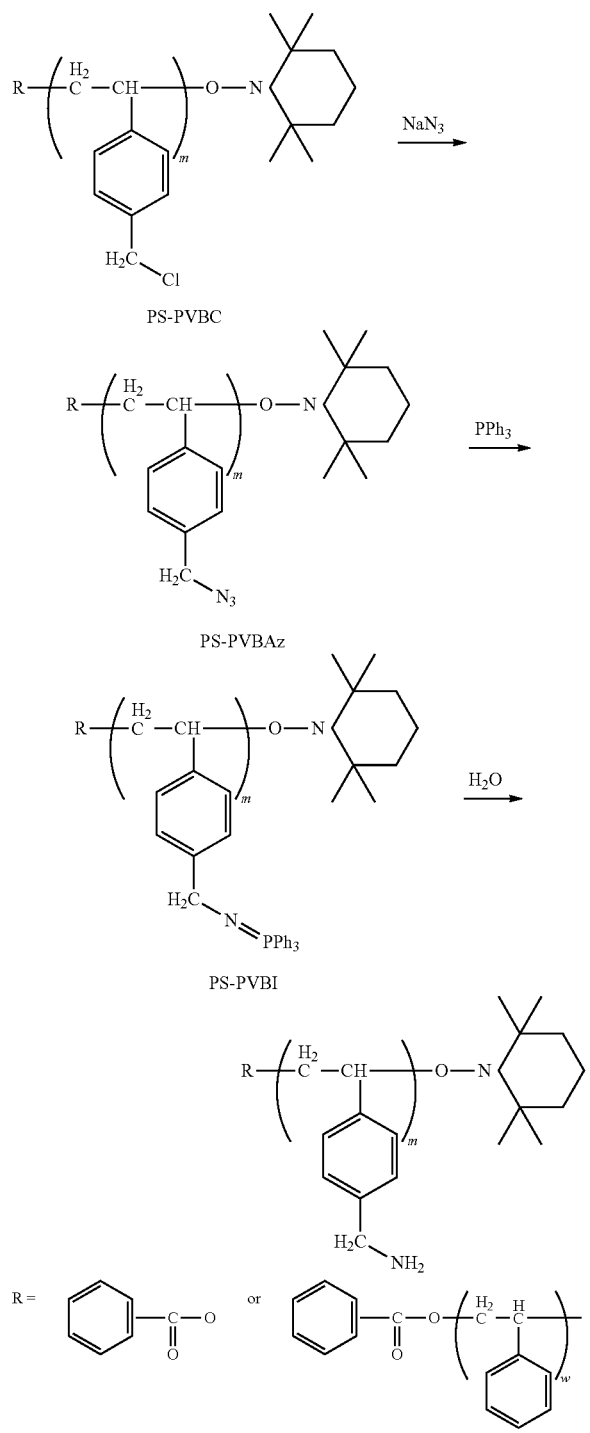

PS-PVBC

PS-PVBAz

PS-PVBI

Initial aeration of wine by decanting and or use of an aerator is considered desirable because of an improvement in the taste of the wine. However, wine that has been exposed to air for an extended period of time, i.e. overnight, will suffer excessive oxidation and degradation of taste. One of the main causes of this taste problem is the production of acetaldehyde by the oxidation of the ethanol present in the wine. Once enough oxidation has occurred the wine is not consumable anymore and is generally just disposed of. The present invention is capable of rejuvenating an overly oxidized wine beverage by absorbing the excess acetaldehyde and other oxidation products created by over exposure to air. The primary amine functionality bonded to the solid resin of this invention will react with compounds like acetaldehyde. A non-limiting example this reaction is illustrated immediately below.

Reaction of Primary Amine with Acetaldehyde

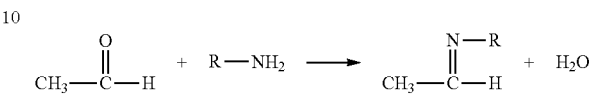

To prevent the removal of desirable compounds from the wine, the ion exchange resin is pretreated. One pretreatment of the ion exchange resin is with a mixture of wine tannins. There are two types of wine tannin—hydrolyzable tannins and condensed tannin which is also called non-hydrolyzable tannin. Condensed tannins are polymers of flavonoids which are condensed through C—C bonds. The most common condensed tannins are polymers of flavanol-3-(catechin group and their epi isomers). Hydrolyzable tannins are copolymers of gallic and/or ellagic acids with sugars. Acids such as tartaric acid can also be used to pretreat the ion exchange resin to prevent binding of desirable wine compounds. It is preferred to pretreat the ion exchange resin with an ion that has the highest affinity for the anionic exchange resin containing the primary amine functionality. A convenient material to use is wine tannin—a product used in wineries to adjust tannin levels. A non-limiting level of tannin to use in pretreating the absorbent would be a solution with water in the range of 0.010%-0.050%.

A preferred primary amine functional resin for use in this invention is the Lewatit OC1065 which contains a primary benzylamine functionality. The primary benzylamine functionality can be converted into a polyamine compound with numerous benzylamine functional groups. The benzylamine itself can be polymerized through the polymerization of a vinyl benzylamine.

Another method to graft a primary amine to a solid support is through plasma treatment of the solid support using a monomer reactive primary amine compound. Plasma polymerization of the benzylamine functional group is also possible.

The functionalized solid phase material is carried within a container such as a thermoformed cartridge which has a space for containing the functionalized solid phase material. The top of the cartridge contains a porous material that allows the liquid beverage to flow into the center space of the cartridge that contains the functionalized solid phase material and contact the functionalized solid phase material. The base of the cartridge contains a filter material to contain the solid phase material within the cartridge but allows the easy flow of the liquid beverage out of the cartridge. The filter material will also trap any cork or other debris from the beverage bottle. The cartridge containing the functionalized solid phase material is designed to fit into the bottom of a container containing an upper portion shaped as a funnel to act as a liquid reservoir to receive the liquid beverage and channel the liquid into the cartridge containing the functionalized solid phase material. Funnel shaped cartridge receptacle contains an outer flange which can act to support the liquid receptacle on top of a glass such as a wine glass suitable for receiving the liquid beverage as it flows through the cartridge and exits the bottom of the cartridge containing reservoir device as illustrated in FIG. 1. The functionalized solid support material contained in the replaceable cartridge can also contain other ingredients such as flow aids to enhance the flow of liquid through the functionalized solid support material. An example of a type of flow aid is charcoal particles blended with the functionalized solid support material. The funnel shaped reservoir device containing the functionalized solid phase material is designed so that the cartridge seals against the compartment designed to receive it in the reservoir device so that all of the liquid poured into the funnel reservoir must flow through the functionalized solid phase material cartridge and can't bypass this component of the device. Part of the cartridge containing the functionalized solid phase absorbent is a filter material located below the functionalized solid phase absorbent to prevent any solid phase particles or other debris from exiting the cartridge and entering the glass receiver of the liquid beverage. The funnel shaped reservoir device can be made from various materials such as molded thermoplastic resins, glass, molded thermosetting polymers, and metals such as stainless steel. A preferred non-limiting material is an injection molded clear acrylic resin such as Acrylite acrylic resin from Evonic.

In the following Experimental Examples, the test for measuring free and total $SO_2$ were made using Hanna Instruments HI 84100 Sulphur Dioxide Minititrator for wine analysis. The instrument uses an oxidation/reduction potential electrode as the sensing device to monitor the reactions occurring in the Ripper method of $SO_2$ analysis. In general the reactions involved in the measurement are as follows:

$IO_3^- + 5I^- + 6H^+ \longrightarrow 3I_2 + 3H_2O$ (Iodine is produced in situ). The iodine produced in the sample then reacts with sulfur dioxide in the wine according to the redox reaction $H_2SO_3 + I_2 + H_2O \longrightarrow H_2SO_4 + 2HI$. The integrated algorithm detects the equivalence point associated with reaction completion. The volume of titrant required to reach the equivalence point is used along with the titrant concentration to calculate the sulfur dioxide concentration in the wine sample. Sample size for titration is 50 mls of wine. Readout of test results is in ppm $SO_2$.

Experimental Example 1

A primary amine functional ion exchange resin was modified by reacting the amine group with and aldehyde group in glutaraldehyde. The pH of the reacting mixture was kept below pH of 7 to prevent the glutaraldehyde from polymerizing. Each primary amine functional site was reacted with one glutaraldehyde molecule resulting in replacing the primary amine functionality with an aldehyde functionality.

1. Weight of Lewatit OC1065 (wet resin)—10.0103 gms.
2. Weight of Water—25.0824 gms.
3. Weight of 50% Glutaraldehyde—4.7035 gms.

This mixture was mixed and allowed to react for 2 hrs. before removing the Lewatit OC1065 resin from the reaction mixture and rinsed with distilled water 3×'s. This step resulted in the primary amine functionality being replaced by an aldehyde functionality. This aldehyde modified resin was then used to treat a wine sample to determine the quantity of total $SO_2$ removed from the wine sample. The aldehyde functionalized Lewatit OC1065 resin was used to treat multiple samples of a wine sample which had a total initial SO2 level of 107 ppm. Results of these treatments are contained in table 1 below.

TABLE 1

Multiple Treatment Cycles Using Monomeric Aldehyde Functionalized Resin

| Cycle | Contact Time (Minutes) | Initial Total SO2 (ppm) | Final Total SO2 (ppm) |
|---|---|---|---|
| 1 | 15 | 107 | 64 |
| 2 | 15 | 107 | 73 |
| 3 | 15 | 107 | 76 |
| 4 | 15 | 107 | 81 |

This experiment demonstrates that the Lewatit OC1065 resin modified by replacing the primary amine functionality with an aldehyde functionality by reacting with glutaraldehyde had a reduced capacity to remove total $SO_2$ in the wine sample with each successive cycle using the same resin. This limited absorption capacity is the result when each primary amine functionality is replaced by a single aldehyde functionality. Example 2

Weight Water: 50.0293 gms
Weight Lewatit OC1065: 10.2035 gms (wet)
Weight 50% Glutaraldehyde: 2.1442 gms Total glutaraldehyde concentration was 2.1% and pH of mixture was 7.3. The mixture was agitated for 15 minutes. Additional 2.1764 gms of 50% glutaraldehyde was added to the resin mixture and pH was raised to 11.9 by addition of 1N sodium hydroxide solution. This higher pH allowed the glutaraldehyde to polymerize in an aldol condensation reaction greatly expanding the resins ability to bind with sulfite contained in the wine sample. This mixture was agitated for 2 hrs. Following this treatment the resin was rinsed with distilled water 3×'s. The resin mixture was then used to treat a Tisdale Chardonnay wine for 18 minutes to 120 minutes. Following the treatment with the polyglutaraldehyde functionalized resin, a 50 ml sample of the Tisdale Chardonnay was titrated for total $SO_2$ using the Hanna Instruments HI 84100 titrator. Results of the titration are contained in Table 2.

TABLE 2

Results of 8 Cycle Wine Treatment Test.

| Cycle | Resin | Contact Time (Minutes) | Initial SO$_2$ (ppm) | Final SO$_2$ (ppm) |
|---|---|---|---|---|
| 1 | OC1065 + Polyglutaraldehyde | — | 148 | 56 |
| 2 | OC1065 + Polyglutaraldehyde | 18 | 148 | 57 |
| 3 | OC1065 + Polyglutaraldehyde | — | 148 | 60 |
| 4 | OC1065 + Polyglutaraldehyde | 30 | 148 | 38 |
| 5 | OC1065 + Polyglutaraldehyde | 30 | 148 | 45 |
| 6 | OC1065 + Polyglutaraldehyde | 120 | 148 | 16 |
| 7 | OC1065 + Polyglutaraldehyde + Untreated Lewatit OC1065 | 35 | 148 | 0 |
| 8 | OC1065 + Polyglutaraldehyde + Untreated Lewatit OC1065 | 21 | 132 | 7 |

For the initial 6 cycles, the wine sample was treated with just the polyglutaraldehyde functional resin. Reusing the same resin with no drop in the resins capacity to remove total $SO_2$ from the wine indicates the capacity was expanded by the polymerization of the glutaraldehyde in the aldol condensation reaction. Cycle 7 and 8 used the initial polyglutaraldehyde resin with the addition of another 7 grams of untreated Lewatit OC1065.

The results of this mixed resin bed showed that the total amount of total $SO_2$ contained in the wine sample was removed by the addition of the benzylamine functional Lewatit OC1065 to the polyglutaraldehyde functional resin. Cycle 8 showed a slight drop in the amount of total $SO_2$ removed from the wine sample. Color was not removed from the wine sample by treatment with the polyglutaraldehyde functional resin. Untreated Lewatit OC1065 did remove wine color without further modification.

Example 3

Multiple samples of chardonnay wine were treated with Lewatit OC1065 for 15 minutes to measure the capacity of the Lewatit resin to bind sulfite from the chardonnay wine.
1. Weight Lewatit OC1065 (wet): 10 gms.
2. Weight Chardonnay: 75 gms.
Results of 4 cycles of treatment by the same Lewatit are contained in Table 3.

TABLE 3

Results of 4 Cycles Wine Treatment with Lewatit OC1065

| Cycle | Resin | Contact Time (Min.) | Initial $SO_2$ (ppm) | Final $SO_2$ (ppm) |
|---|---|---|---|---|
| 1 | Lewatit OC1065 Unmodified | 15 | 123 | 0 |
| 2 | Lewatit OC1065 Unmodified | 15 | 123 | 6 |
| 3 | Lewatit OC1065 Unmodified | 15 | 123 | 14 |
| 4 | Lewatit OC1065 Unmodified | 15 | 123 | 23 |

The initial cycle of treatment saw all of the free and bound sulfite removed from the wine sample. Subsequent treatment cycles resulted in slightly higher final sulfite levels but still greatly reduced from the original sulfite level in the wine sample. Treatment with the unmodified Lewatit OC1065 resin did result in the color from the chardonnay wine being removed and resulting in the treated wine sample being water clear.

Example 4

In this example the Lewatit OC1065 was treated with a mixture of wine tannins available as Wine Tannins from LD Carlson Company. The resin was used to treat three different wine samples of approximately 70 grams each. Results of 3 cycles of treatment by the same modified Lewatit OC1065 resin are contained in Table 4 below.

TABLE 4

Effect of Wine Tannin Pretreatment

| Cycle | Resin | Contact Time (min) | Initial $SO_2$ (ppm) | Final $SO_2$ (ppm) |
|---|---|---|---|---|
| 1 | Lewatit OC1065 modified with Tannins | 15 | 131 | 6 |
| 2 | Lewatit OC1065 modified with Tannins | 15 | 131 | 19 |

TABLE 4-continued

Effect of Wine Tannin Pretreatment

| Cycle | Resin | Contact Time (min) | Initial $SO_2$ (ppm) | Final $SO_2$ (ppm) |
|---|---|---|---|---|
| 3 | Lewatit OC1065 modified with Tannins | 15 | 131 | 37 |

The treatment of the Lewatit OC1065 with the wine tannin mixture resulted in a slightly lower % removal of the wine sulfite in each cycle as compared to the untreated version of the resin but still greatly reduced from the original total $SO_2$ content of the wine sample. The color of the wine sample was preserved.

This experiment demonstrates a non-limiting technique which can be used to prevent the absorbent resin from removing the color from the wine sample while still removing most of the total $SO_2$ content of the wine.

Example 5

Diatomaceous earth was treated with 2% polyethyleneimine solution in water and ethanol and allowed to dry. The dried diatomaceous earth was broken up into very fine pieces and placed in a vacuum funnel with a 1 micron filter paper on the bottom of the vacuum filter. The vacuum funnel was placed in a vacuum flask containing a connection for a vacuum line. The sample of chardonnay wine with an initial total $SO_2$ level of 81 ppm was poured on top of the bed of diatomaceous and a vacuum of 20 inches was pulled on the vacuum flask accelerating the rate at which the chardonnay wine sample was pulled through the bed of treated diatomaceous earth. The final total $SO_2$ level was 23 ppm.
1. Weight polyethyleneimine 50% in water. 3.02 gms.
2. Weight ethanol. 68.07 gms.
3. Weight Diatomaceous Earth. 40.66 gms.
This example shows the ability of a polymeric polyamine compound to remove most of the total $SO_2$ in the wine sample with a very short contact time. The entire wine sample was passed through the bed of functionalized diatomaceous earth in a period of about a minute.

The invention claimed is:
1. A sulfite-removing material in the form of beads for placement in contact with a liquid for removing sulfite ions from the liquid, comprising;
   a solid support bead having on a surface of the solid support, a sulfite-removing resin,
   the sulfite-removing resin having:
      a) linking groups on external surfaces of the sulfite-removing resin,
      b) the sulfite-removing resin comprising a polymer of multiple individual polymeric units selected from the group consisting of polyethyleneimine groups, amine groups and carbonyl groups,
      c) wherein substantially all of the individual polymeric units are capable of binding with and removing a sulfite ion in solution in the liquid, and
      d) the linking groups are each linked to a proximal end of each sulfite-removing resin to retain the sulfite-removing resin on the surface of the solid support so that each sulfite removing polymer molecule extends outwardly from the surface of the solid support to a distal end of the sulfite removing polymer.

2. The sulfite-absorbing resin material as defined in claim 1 wherein the polymeric units of the sulfite-removing resin consist essentially of carbonyl groups.

3. The sulfite-absorbing resin material as defined in claim 1 wherein the polymeric units of the sulfite-removing resin consist essentially of amine groups.

4. The sulfite-absorbing resin material as defined in claim 1 wherein the polymeric units of the sulfite-removing resin comprise polymeric units selected from the group consisting of at least two of amine groups, imine groups and carbonyl groups.

5. The sulfite-removing resin material of claim 1 comprises a polyethyleneimine group.

6. The sulfite-removing resin material as defined in claim 2 wherein the carbonyl polymer comprises polyglutaraldehyde.

7. The sulfite-removing resin material of claim 1 wherein polymeric units comprise imine units.

8. The sulfite-removing resin material of claim 4 wherein the amine polymeric units comprise a polybenzylamine and the carbonyl groups comprise a polyglutaralehyde.

9. A sulfite-removing bead material for placing in contact with a liquid for removing sulfite ions from the liquid comprising:
   a solid support polymer bead having on a surface of the support polymer, a polyethyleneimine resin,
   the polyethyleneimine resin having:
   a) linking groups on external surfaces of the polyethyleneimine resin,
   b) sulfite removing molecules comprising a polymer of polymeric units selected from the group consisting of polyethyleneimine groups, amine groups and carbonyl groups,
   c) wherein the polymeric units comprising polyethyleneimine groups, amine groups or carbonyl groups are capable of binding with and removing a sulfite ion in solution in the liquid, and
   d) the linking groups are each linked to a proximal end of each sulfite removing polymer molecule to retain the removing polymer molecules on the surface of the solid support polymer so that at least some molecules of the sulfite-removing polymer molecule extend outwardly from the surface of the solid support polymer to a distal end of the sulfite removing polymer.

10. The bead material of claim 9 as a bed of multiple functionalized beads.

11. The bead material of claim 10 enclosed in a cartridge with openings in the cartridge for fluid flow.

12. The bead material of claim 9 wherein the sulfite removing polymer molecules consist of a mixture of carbonyl polymers, imine polymers and amine polymers.

13. The bead material of claim 11 wherein the sulfite-removing polymer molecules are a mixture of at least two of carbonyl polymers, imine polymers and amine polymers.

14. The bead material of claim 9 wherein the sulfite-removing polymer molecules comprise at least one polymer selected from the group consisting of carbonyl polymers, imine polymers and amine polymers.

15. The bead material of claim 10 wherein the sulfite-removing polymer molecules comprise at least one polymer selected from the group consisting of carbonyl polymers, imine polymers and amine polymers.

* * * * *